US009422610B2

(12) United States Patent
Chaiko et al.

(10) Patent No.: US 9,422,610 B2
(45) Date of Patent: Aug. 23, 2016

(54) ACTIVATED SEMICONDUCTOR COMPOUNDS HAVING INCREASED ELECTROCHEMICAL REACTIVITY AND ASSOCIATED METHODS THEREOF

(71) Applicant: FLSmidth A/S, Valby (DK)

(72) Inventors: David J. Chaiko, South Jordan, UT (US); Sara (Sally) Rocks, Sandy, UT (US)

(73) Assignee: FLSmidth A/S (DK)

(*) Notice: Subject to any disclaimer, the term of this patent is extended or adjusted under 35 U.S.C. 154(b) by 0 days.

(21) Appl. No.: 14/992,783

(22) Filed: Jan. 11, 2016

(65) Prior Publication Data

US 2016/0201162 A1    Jul. 14, 2016

Related U.S. Application Data

(63) Continuation-in-part of application No. PCT/US2015/067188, filed on Dec. 21, 2015, and a continuation-in-part of application No. PCT/US2015/050045, filed on Sep. 14, 2015, and a continuation-in-part of application No. PCT/US2015/061761, filed on Nov. 20, 2015, and a continuation-in-part of application No. PCT/US2015/062000, filed on Nov. 20, 2015.

(60) Provisional application No. 62/101,932, filed on Jan. 9, 2015, provisional application No. 62/141,741, filed on Apr. 1, 2015, provisional application No. 62/156,165, filed on May 1, 2015, provisional application No. 62/195,204, filed on Jul. 21, 2015, provisional application No. 62/209,263, filed on Aug. 24, 2015.

(51) Int. Cl.
*C22B 3/08* (2006.01)
*C22B 3/22* (2006.01)
*C22B 15/00* (2006.01)
*H01B 1/02* (2006.01)

(52) U.S. Cl.
CPC ............... *C22B 15/0071* (2013.01); *C22B 3/08* (2013.01); *C22B 3/22* (2013.01); *H01B 1/02* (2013.01)

(58) Field of Classification Search
CPC ........ C22B 15/0071; C22B 3/08; C22B 3/22; H01B 1/02
See application file for complete search history.

(56) References Cited

FOREIGN PATENT DOCUMENTS

JP    H0261774    * 12/1990

* cited by examiner

*Primary Examiner* — George Wyszomierski
*Assistant Examiner* — Tima M McGuthry Banks
(74) *Attorney, Agent, or Firm* — Jeffrey A. Sharp; Matthew R. Weaver; Daniel DeJoseph

(57) ABSTRACT

Disclosed are novel compounds which display enhanced reactive properties due, in part, to induced lattice strain. The new compounds demonstrate accelerated leaching of copper under oxidizing conditions. The activated compounds are produced under conditions of time, temperature, Eh, and pH which retard the rate of lattice strain relaxation. Further disclosed are methods of making and using the novel compounds.

14 Claims, 7 Drawing Sheets

| h k l | XRD Reference Pattern, Covellite d-spacing, Å | Synchrotron CuS Reference Pattern d-spacing, Å | HRTEM (this work, (near surface) d-spacing, Å |
|---|---|---|---|
| 1 0 0 | 3.287 | 3.281 | 3.28 |
| 1 0 5 | 2.319 | 2.315 | 2.24 |
| 1 0 6 | 2.099 | 2.095 | 2.22 |
| 0 0 8 | 2.045 | 2.042 | 2.04 |

FIGURE 2

ACTIVATED SEMICONDUCTOR COMPOUNDS HAVING INCREASED ELECTROCHEMICAL REACTIVITY AND ASSOCIATED METHODS THEREOF

CROSS-REFERENCE TO RELATED APPLICATIONS

This application claims priority to and the benefit of, or relates to the following applications: co-pending application PCT/US2015/067188, filed on 21 Dec. 2015, which is titled: "METHODS FOR RAPIDLY LEACHING CHALCOPYRITE"; co-pending U.S. Provisional Patent Application No. 62/101,932, filed on 9 Jan. 2015, titled: "ACTIVATED CHALCOPYRITE NANOCOMPOSITE COMPOSITIONS HAVING INCREASED ELECTROCHEMICAL REACTIVITY AND ASSOCIATED METHODS THEREOF"; U.S. Provisional Patent Application No. 62/141,741, filed on 1 Apr. 2015, titled: "ACTIVATED CHALCOPYRITE NANOCOMPOSITE COMPOSITIONS HAVING INCREASED ELECTROCHEMICAL REACTIVITY AND ASSOCIATED METHODS THEREOF"; U.S. Provisional Patent Application No. 62/156,165, filed on 1 May 2015, titled: "RAPID OXIDATIVE LEACH PROCESS AND APPARATUS THEREOF"; U.S. Provisional Patent Application No. 62/195,204, filed on 21 Jul. 2015, titled: "RAPID OXIDATIVE LEACH PROCESS USING MECHANO-CHEMICAL PROCESSING AND CHEMICAL ACTIVATION FOR TREATING CHALCOPYRITE"; U.S. Provisional Patent Application No. 62/209,263, filed on 24 Aug. 2015, which is titled: "HIGH SHEAR STIRRED TANK REACTOR FOR IN-SITU MECHANO-CHEMICAL/PHYSICO-CHEMICAL ACTIVATION"; co-pending application PCT/US2015/050045, filed on 14 Sep. 2015, which is titled: "SYSTEM AND METHOD FOR ENHANCED METAL RECOVERY DURING ATMOSPHERIC LEACHING OF METAL SULFIDES"; co-pending application PCT/US2015/061761, filed on 20 Nov. 2015, which is titled: "SYSTEM AND METHOD FOR ENHANCED METAL RECOVERY DURING ATMOSPHERIC LEACHING OF METAL SULFIDES"; and co-pending application PCT/US2015/062000, filed on 20 Nov. 2015, which is titled: "ACTIVATION SYSTEM AND METHOD FOR ENHANCING METAL RECOVERY DURING ATMOSPHERIC LEACHING OF METAL SULFIDES".

The contents of these applications are hereby incorporated by reference in their entirety for any and all purposes, as if fully set forth herein.

FIELD OF THE INVENTION

This application pertains to novel semiconductor compounds and methods of their formation and subsequent use. In particular, this application pertains to novel semiconductor compounds comprising Formula I, with enhanced electronic and chemical reactivity, and methods of making said semiconductor compounds. Compounds comprising Formula I and derivatives thereof can be utilized in the production of copper metal.

BACKGROUND OF THE INVENTION

Current and past methods of atmospheric leaching of primary metal sulfides, like Chalcopyrite, Tennantite, and Enargite suffer from slow reaction kinetics and poor metal dissolution rates and recoveries due, in part, to the formation of polysulfides and of iron-deficient sulfides ($Cu_{1-x}Fe_{1-y}S_{2-z}$) which lead to surface passivation films.

Even with pretreatment by ultra-fine grinding (e.g., P80 of 5-15 μm), surface passivation reactions continue to be problematic. Efforts to reduce leach times to under 5-6 hours in which the concentrates are pretreated, prior to leaching, by ultra-fine grinding of metal sulfides have been unsuccessful. Improved methods are needed to reduce leach times and increase metal recoveries to 98%+ with grinding energies as low as 100-300 kW·h/tonne of copper produced.

Still others have attempted to avoid the surface passivation reactions that plague the leaching of primary sulfides by chemical pre-treatment of chalcopyrite to effect its quantative conversion to a variety of more-readily-leached iron-deficient copper sulfide phases. The success of these various approaches depends upon the degree of conversion of chalcopyrite to covellite, which needs to be as close to 100% as practical. For example, U.S. Pat. No. 6,592,644 (now abandoned) teaches on the quantitative conversion of chalcopyrite ($CuFeS_2$) to covellite ($CuS$) and pyrite ($FeS_2$) prior to leaching under oxidizing conditions. The conversion process being represented by the following equation:

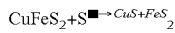

To proceed at commercially viable rates, the reaction must be carried out at elevated temperatures (e.g., 300-500° C.) and/or catalyzed by microwave irradiation. The present invention departs from all prior art methods involving chalcopyrite metathesis in that the effectiveness is, to a large part, independent of the degree of conversion of chalcopyrite.

Others have attempted to avoid surface passivation reactions by an approach wherein the primary sulfides are quantitatively converted to a mixture of more-readily-leached, secondary copper sulfides (i.e., the semiconductors $Cu_2S$, $Cu_9S_5$, $Cu_{1.8}S$, and the electronic conductor $CuS$). Several of these chemical approaches being represented by the following equations:

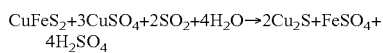

Reactions involving reducing agents, like sulfur dioxide, are inefficient because they involve secondary reactions which convert extensive amounts of already solubilized copper to insoluble copper sulfide. In this approach (For Example U.S. Pat. No. 4,256,553) significant levels of chalcopyrite conversion to secondary sulfides is required to reach acceptable levels of copper recovery during oxidative leaching. The use of a reducing agent represents an additional material handling cost and process complications.

Still other prior art methods have attempted to increase leach rates and copper recoveries through the use of solid-state chemical metathesis of chalcopyrite to a mixture of covellite, chalcocite ($Cu_2S$) and digenite ($Cu_{1.8}S$) (see for example, G. M. Swinkels and R. M. G. S. Berezowsky, "The Sherritt-Cominco Copper Process—Part 1: The Process," CIM Bulletin, February 1978, pp. 105-121; see also R. D. Peterson and M. E Wadsworth, "Solid, Solution Reactions in the Hydrothermal Enrichment of Chalcopyrite at Elevated Temperatures," The Minerals, Metals & Materials Society, EPD Congress, G. Warren Ed., pp. 275-291, 1994; and W. A. Yuill, D. B. Wilson, R. O. Armstrong and B. A. Krebs, "Copper Concentrate Enrichment Process," presented at the AIME Annual Meeting, Los Angeles, Calif., February 1984). These solid-state reactions involve the replacement of iron within the chalcopyrite lattice by copper. These metathesis reactions are characteristically slow because they involve the solid-state diffusion of copper and iron through the product layer as the rate controlling step. These reactions may take as much as 100 hours to complete. Several of these metathesis approaches are represented by the following equations:

$$CuFeS_2 + CuSO_4 \rightarrow 2CuS + FeSO_4$$

$$CuFeS_2 + 3CuSO_4 + 3FeSO_4 \rightarrow 2Cu_2S + 2Fe_2(SO_4)_3$$

$$5CuFeS_2 + 11CuSO_4 + 8H_2O \rightarrow 8Cu_2S + 5FeSO_4 + 8H_2SO_4$$

$$5CuS + 3CuSO_4 + 4H_2O \rightarrow 4Cu_2S + 4H_2SO_4$$

$$6CuS + 3CuSO_4 + 4H_2O \rightarrow 5Cu_{1.8}S + 4H_2SO_4$$

As with other prior art methods there is a need with these approaches to achieve near-complete conversion of chalcopyrite to the more-readily-leached secondary sulfides. Furthermore, prior art metathesis reaction methods utilize molar ratios of $Cu^{2+}/CuFeS_2$ that are equal to or greater than one (e.g., 1-4). These high molar ratios of $Cu^{2+}/CuFeS_2$ represent an inefficiency in the use of metathesis reactions and raises the difficult issue of economically sourcing sufficient amounts of $Cu^{2+}$ to carry out the metathesis reactions.

Additionally, metathesis reactions require the use of high temperatures (e.g., 175-200° C.) under autoclave conditions to achieve the required degree of conversion within acceptable process times. Even with the use of high temperatures, accompanied by ultra-fine grinding of the feed, reaction times of 10-100 hours are required to reach 40-90% conversion of chalcopyrite to secondary sulfides. Additionally, several of the approaches involve the production of acid which is problematic as it involves the oxidation of sulfide to sulfate, thereby adding to the cost of the process.

Attempts to carry out chemical metathesis reactions under atmospheric conditions have met with little success (see H-J. Sohn and M. E. Wadsworth, "Chemical Conversion of Chalcopyrite to Copper Sulfides," SME-AIME Annual Meeting, Los Angeles Calif., February 26-Mar. 1, 1984). Metathesis reactions at lower temperatures, using prior art methods, require pre-grinding of the feed in attritor mills for one hour or longer and reaction conditions of 0.5 wt % solids. These requirements make low-temperature metathesis uneconomical. Furthermore, this approach is also plagued by parasitic side reactions which consume $CuSO_4$ to yield products like $Cu_{1.8}S$, which are undesirable.

More efficient activation processes for improving the hydrometallurgical processing of primary metal sulfides are needed. Unlike prior art methods wherein the extent of oxidative Cu dissolution is directly proportional to the degree of chemical metathesis, an improved method is needed wherein an activated semiconductor product is produced. The improved method would provide for a chemical reaction which leads to new chemical compounds displaying enhanced reactivities, in much the same way that doping of semiconductors is used to introduce point defects. A purpose for creating such compounds would be to enhance electronic and/or photonic properties. An improved activation process would be: 1) rapid—requiring as little as 1-60 minutes to complete, 2) able to function efficiently at moderate temperatures (e.g., less than 100° C.), able to operate efficiently at high solids concentrations, 3) acid neutral—that is not consume or produce acid, 4) capable of enabling copper dissolution to levels in excess of 90-95% in 3-6 hours or less. Additionally, an improved activation process would be free of parasitic side reactions which consume $Cu^{++}$ which in turn diminishes the reactivity of the semiconductor product.

A need exists for new chemically reactive compounds which can be readily prepared on a large scale from common copper ores and concentrates containing primary sulfides like chalcopyrite, and from which copper can be easily extracted by oxidative dissolution. The subject matter disclosed herein at least partially satisfies this need.

SUMMARY OF THE INVENTION

Compounds which display enhanced oxidative leaching of copper are disclosed. These compounds may comprise a chemical segment comprising a lattice-strained semiconductor moiety, with the lattice strain being imparted by the presence of a meta-stable, iron- and sulfur-depleted copper sulfide moiety. The present invention also provides for the preparation of an activated, meta-stable compound which exhibits enhanced oxidative leach properties as compared to chalcopyrite ores and chalcopyrite-containing concentrates.

Other new compounds, methods of producing new compounds, and methods of utilizing the new compounds or modifying the new compounds to derive even further new compounds may be appreciated from the below description and appended drawings. This application includes subject matter in common with U.S. provisional patent application 62/082,293, filed 20 Nov. 2014, the entirety of which is incorporated herein by reference. U.S. provisional patent application 62/082,293 describes methods that can be used to improve oxidative leach characteristics of chalcopyrite.

BRIEF DESCRIPTION OF THE DRAWINGS

To complement the description which is being made, and for the purpose of aiding to better understand the features of the invention, a set of drawings illustrating new compounds and methods of forming and using the same is attached to the present specification as an integral part thereof, in which the following has been depicted with an illustrative and non-limiting character. It should be understood that like reference numbers used in the drawings (if any are used) may identify like components.

FIG. 2 is a table showing lattice d-spacings of activated, unrelaxed material that were measured using Fast Fourier Transform (FFT) analysis of the lattice images from HRTEM diffractograms. The activated product appears to be highly crystalline—however, the d-spacings in this region do not completely match any of the required values for covellite, chalcopyrite, pyrite or the chalcocite-digenite series. While two of the d-spacings are quite similar to covellite, two of the spacings do not match covellite. This indicates a structure that differs from traditional covellite and is an iron- and sulfur-depleted moiety that is transitionary between chalcopyrite and covellite, and possessing significant lattice strain.

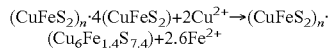
$(CuFeS_2)_n \cdot 4(CuFeS_2) + 2Cu^{2+} \rightarrow (CuFeS_2)_n \cdot (Cu_6Fe_{1.4}S_{7.4}) + 2.6Fe^{2+}$ wherein involvement of sulfur is required to maintain electroneutrality.

Figure 1:
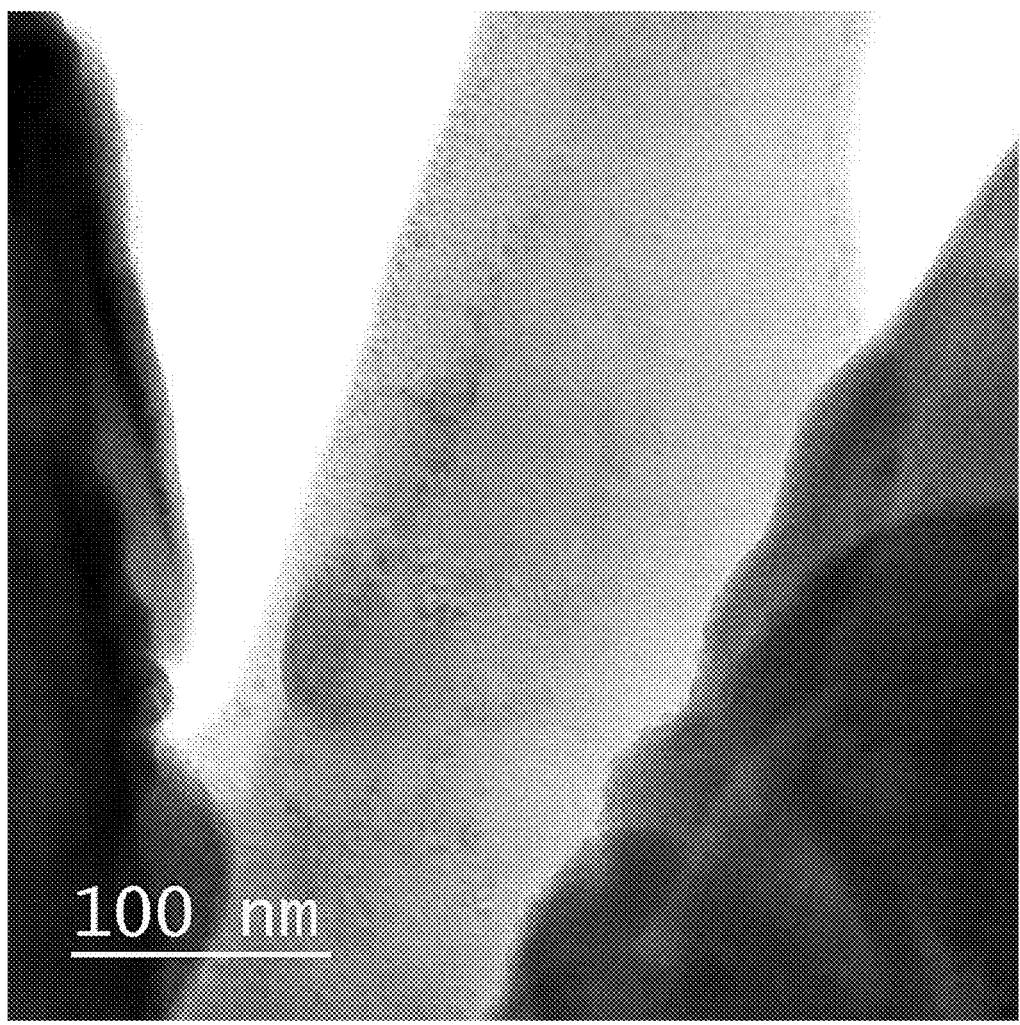
FIG. 1 shows a High Resolution Transmission Electron Microscopy (HRTEM) image of a particle comprising Formula I. TEM analysis is centered on specimen areas that show the presence of a surface layer covering an underlying chalcopyrite moiety. This image and other higher magnification images indicate a smooth transition between the iron- and sulfur-depleted moiety and the strained semiconductor moiety. Notably absent is any evidence of stress cracking or spalling.
Figure 3:
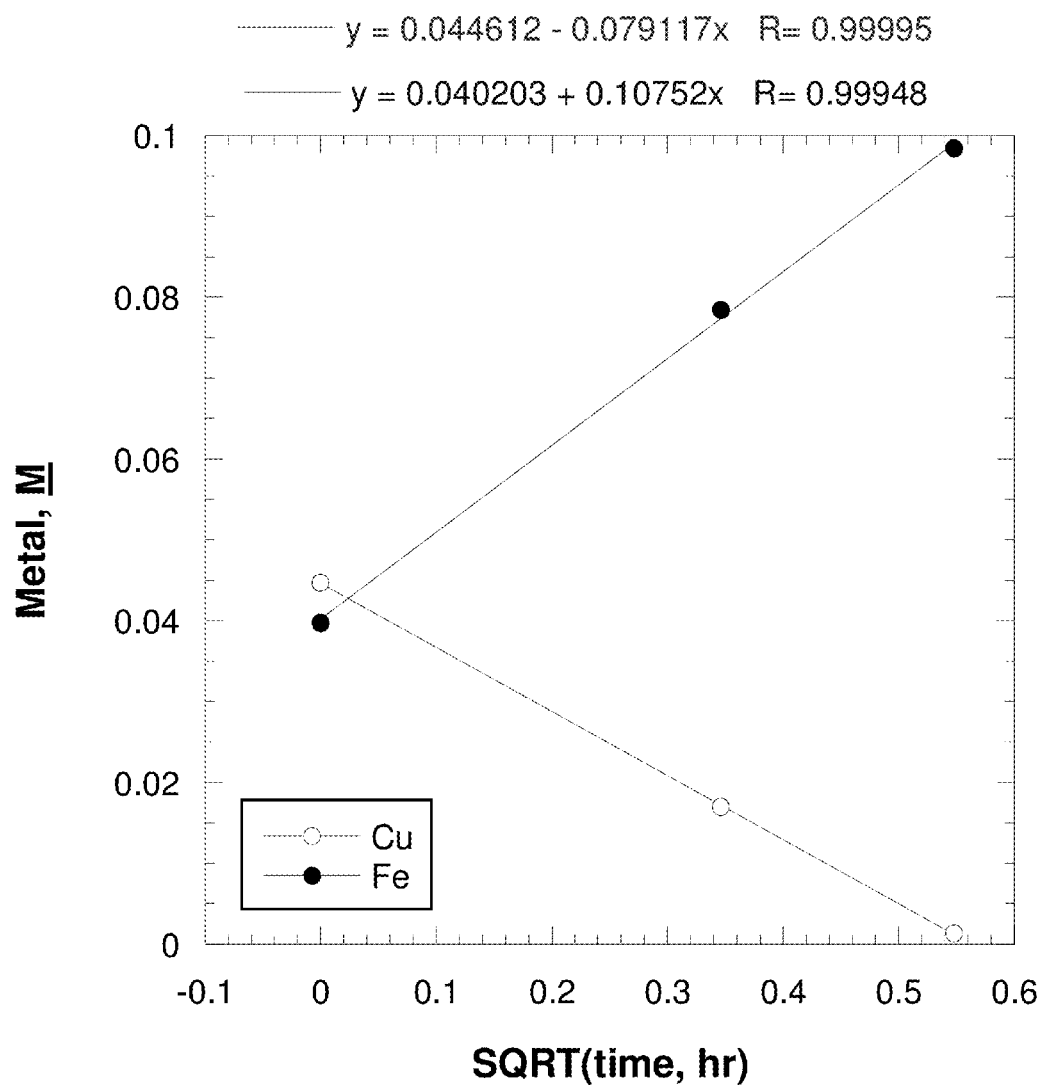
FIG. 3 is a graph comparing the iron release rate and copper absorption rate during the activation reaction. In the traditional metathesis reaction of chalcopyrite with copper sulfate, as described by prior art, copper within the semiconductor lattice is exchanged by iron with a 1:1 molar ratio. In the method described herein, the reaction of copper sulfate with chalcopyrite results in the release of an excess of iron beyond the prior art's 1:1 molar ratio. In this Figure, the rate of iron release from a copper concentrate (59 wt % $CuFeS_2$) is approximately 1.3 times greater than the rate of copper absorption by the chalcopyrite. The activation reaction was conducted at 80° C., $Cu^{2+}$: $CuFeS_2$ molar ratio of 0.066, pH 1.8, 15 wt % solids and under mechano-chemical conditions using a stirred-media reactor. The concentrate was pre-ground to a P80 of 17.5 μm. The release of iron in excess of the copper absorbed indicates the creation of an iron- and sulfur-depleted copper sulfide product. The observed reaction stoichiometry would dictate the following equation.
Figure 4:
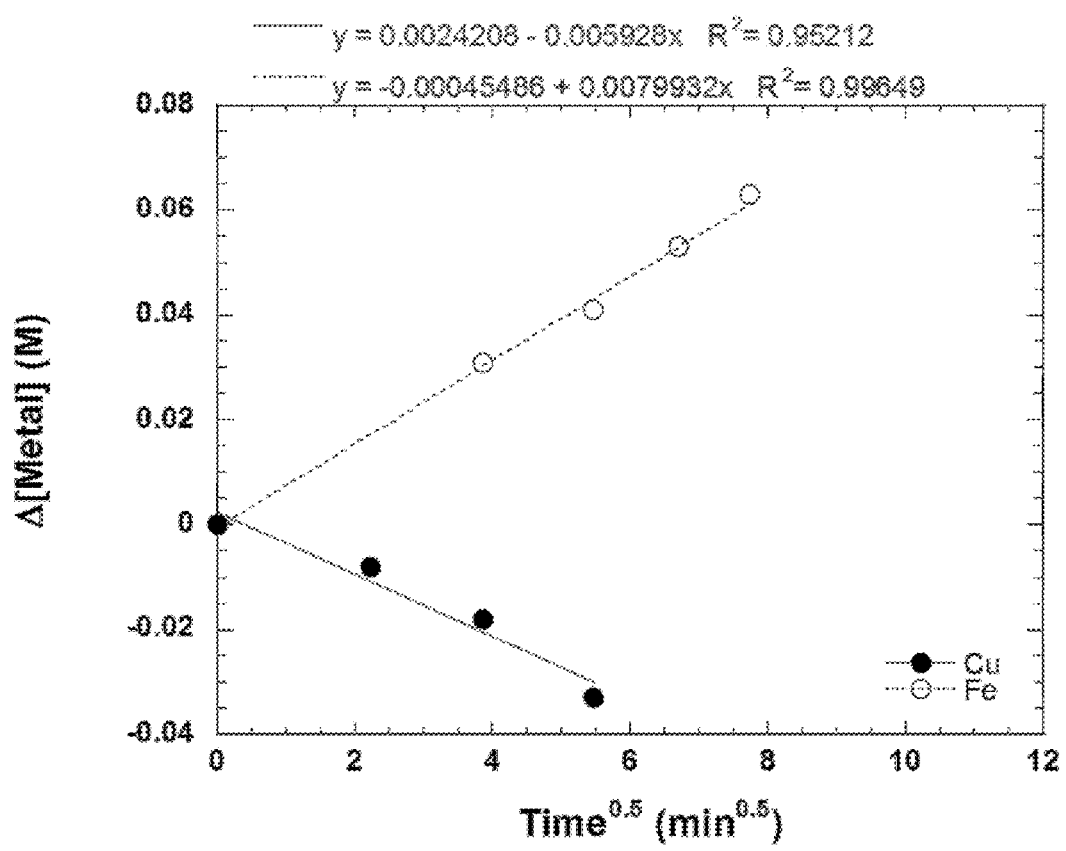

FIG. 4 also shows a comparison of the rate of iron released to the rate of copper absorbed during the activation reaction. In this Figure, the iron released from a museum-quality chalcopyrite sample is approximately 1.3 times greater than the copper absorbed. The activation was conducted in a stirred beaker at 80° C., $Cu^{2+}$: $CuFeS_2$ molar ratio of 0.04, pH 1.8, and 27 wt % solids. The chalcopyrite sample was pre-ground to a P80 of 24 μm. The data in this Figure illustrate that the observed stoichiometric excess of iron release is not an artifact of impurities in the copper concentrate samples used previously, or solely due to the mechano-chemical process. Instead, the additional iron released above the stoichiometric equivalent of copper absorbed by the chalcopyrite is indicative of the formation of a highly strained, iron- and sulfur-depleted, intermediate product (i.e., Formula I) that differs from covellite.

Figure 5:
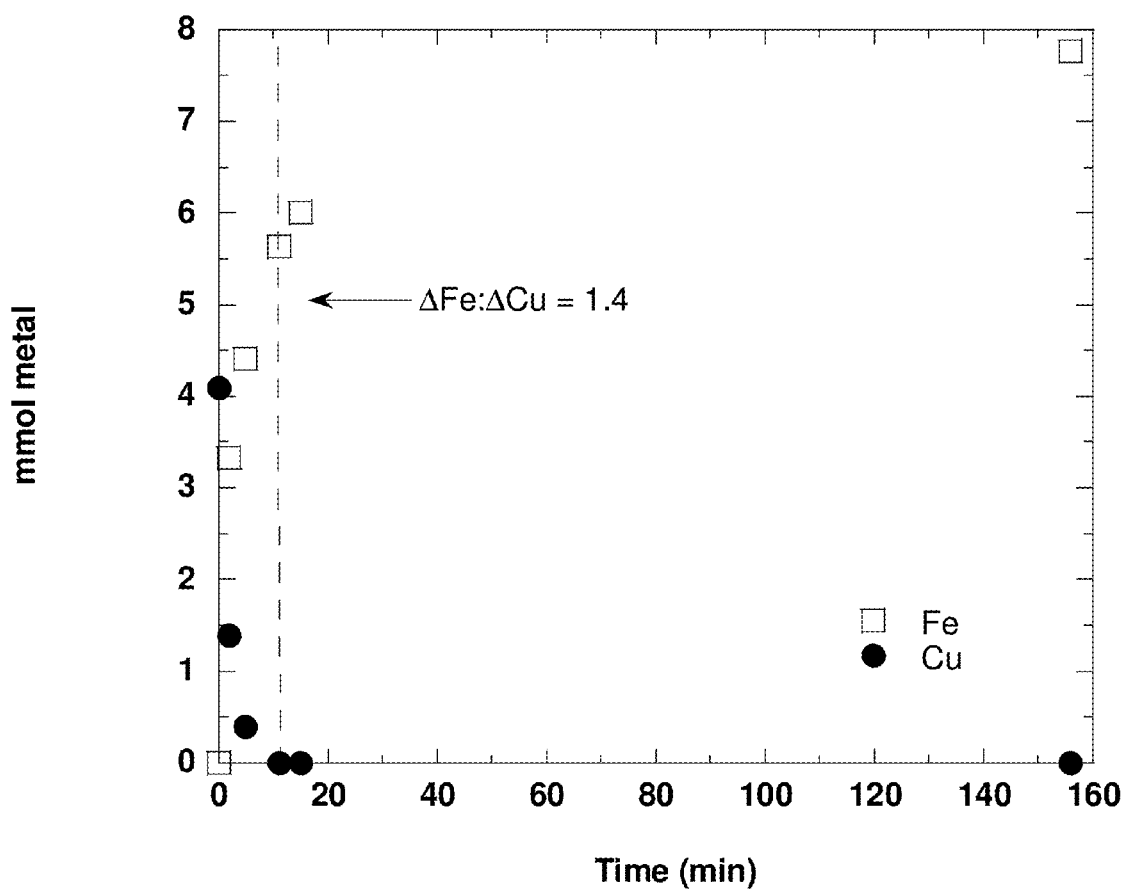

The data in FIG. 5 show that the release of iron from the chalcopyrite lattice continues after all copper has been depleted from solution. Measurement of the mmoles of soluble metal (i.e., $Cu^{2+}$ & $Fe^{2+}$) as a function of time indicates that despite all copper being absorbed, iron continues to be released by the activated chalcopyrite (i.e., Formula I). When no copper remains in solution, the molar ratio of iron released to copper absorbed is approximately 1.4. With additional time, the extent of iron released approaches a 2:1 molar ratio (i.e., $Fe^{2+}/Cu^{2+}$) based on the amount of copper absorbed. Without wishing to be held to a particular theory, we believe that the continued release of iron is due to relaxation (i.e., an unwanted, parasitic side reaction) of the strained lattice within the activated product (Formula I). At a 2:1 ratio of iron released to copper absorbed, the final product is expected to be a simple, physical mixture of chalcopyrite+ covellite (i.e., Formula IV). The activation was conducted in a stirred beaker at 80° C., $Cu^{2+}$: $CuFeS_2$ molar ratio of 0.01, pH 2.5, and 27 wt % solids. The high-purity chalcopyrite sample was pre-ground to a P80 of 24 μm. The observed reaction stoichiometry would dictate the following equation:

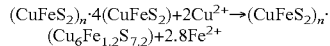
$(CuFeS_2)_n \cdot 4(CuFeS_2) + 2Cu^{2+} \rightarrow (CuFeS_2)_n \cdot (Cu_6Fe_{1.2}S_{7.2}) + 2.8Fe^{2+}$ wherein involvement of sulfur is required to maintain electroneutrality.

Figure 6:
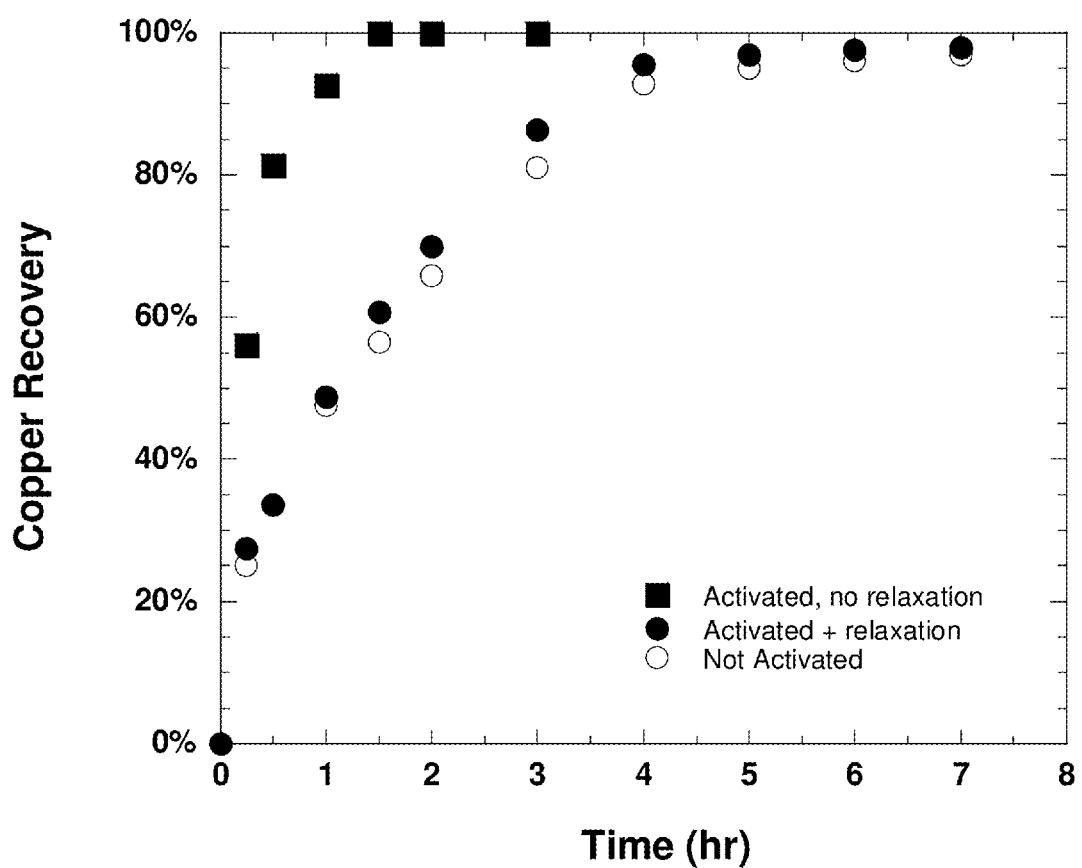

FIG. 6 shows oxidative copper leach data for compounds of Formula I (■), chalcopyrite compositions containing Formula IV (●) and an un-activated chalcopyrite concentrate (○). When a copper concentrate containing Formula I is allowed to degrade to Formula IV, via lattice relaxation and concomitant loss of iron, all benefits of the activation are lost. Consequently, the chalcopyrite concentrate containing Formula IV oxidatively leaches like the untreated copper concentrate (○). In other words, lattice relaxation through iron release and subsequent formation of covellite (Formula IV) shows no beneficial effects for oxidative leach kinetics. The leaching of Formula I, with or without the use of a Stirred-Media reactor to promote and maintain lattice strain, results in dramatically improved, oxidative copper leach rates. As a reference, the un-activated chalcopyrite concentrate was leached mechano-chemically using a stirred-media reactor in the presence of an acidic ferric sulfate lixivant. The same feed and leach conditions were used for the leach testing of Formula IV and the chalcopyrite concentrate. The activation reaction was conducted at pH 6, 80° C., 36 wt % solids, and using a Cu:$CuFeS_2$ molar ratio of 0.01. The degradation of the compound defined by Formula I to the compound defined by Formula IV, occurred within approximately 20 minutes. The leach test conducted on activated and strained copper concentrate described by Formula I was produced mechano-chemically within a stirred-media reactor, at 15% solids, pH 1.8, 80° C. and with a copper:chalcopyrite molar ratio of 0.07. Oxidative leaching was conducted with 44 g $L^{-1}$ $H_2SO_4$, 20 g $L^{-1}$ initial iron with an initial Eh (vs. SHE) of 680 mV.

Figure 7:
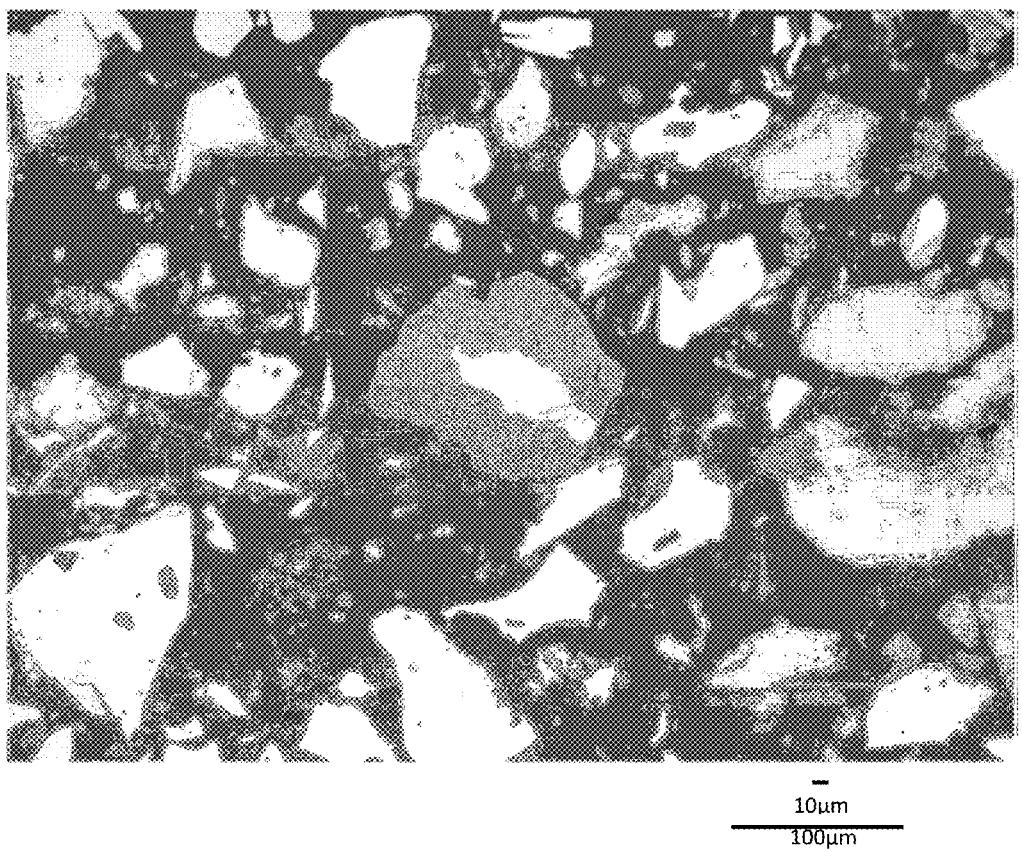

FIG. 7 is a photomicrograph of a copper concentrate containing covellite-rimmed chalcopyrite particles which are outside of the scope of the present invention. The leaching properties of this material does not exhibit the enhanced leach characteristics of the compounds defined by the Formulas I, II, III.

In the following, the invention will be described in more detail with reference to drawings in conjunction with exemplary embodiments.

DETAILED DESCRIPTION OF THE INVENTION

Compounds suitable for enhanced oxidative leaching are disclosed. The compounds comprise a lattice strained, semiconductor moiety. The compounds exhibit enhanced oxidative leach properties for improved dissolution and recovery of copper.

The disclosed compounds are defined by Formula I:

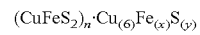
$(CuFeS_2)_n \cdot Cu_{(6)}Fe_{(x)}S_{(y)}$  I wherein
n is 10 to 200,
x is 1.2 to 1.4,
y is 7.2 to 7.4,
and y−x=6.

Thus, the two end member compounds will be defined by Formula II and Formula III, respectively:

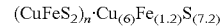
$(CuFeS_2)_n \cdot Cu_{(6)}Fe_{(1.2)}S_{(7.2)}$  II

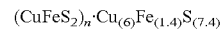
$(CuFeS_2)_n \cdot Cu_{(6)}Fe_{(1.4)}S_{(7.4)}$  III wherein n is 10 to 200.

It will be understood that the compounds of the present invention derive their improved copper oxidative leaching properties by virtue of the induced lattice strain within the $CuFeS_2$ portion of the Formula I. Furthermore, it will be understood that under certain conditions of Eh, pH, temperature, and time, the compounds defined by Formula I may, given sufficient activation energy, undergo degradation to a compound defined by Formula IV:

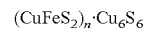
$(CuFeS_2)_n \cdot Cu_6S_6$  IV wherein n is 10 to 200.

It will be understood that compounds defined by Formula IV are not expected to exhibit accelerated dissolution of $CuFeS_2$ moiety during the oxidative dissolution of $Cu^{2+}$, as they are simple physical mixtures of chalcopyrite and covellite.

The preparation of the compounds defined by Formula I may be performed via solid-state, high-solids density slurries and low-solids density slurries while providing cupric ions and having a low ferric ion activity, such that the activation reaction proceeds at an appreciable rate and extent. In some preferred embodiments, the interfacial pH and/or the pH of the slurry is controlled to be not less than about 1.1, preferably not less than about 1.8, and more preferably not less than about 2.5, but lower than about pH 6 so as to not interfere with $Cu^{2+}$ ion activity. A more preferred pH is that which is substantially equal to the isoelectric point (IEP) of the chalcopyrite surface (i.e., pH 1.8 to 2.0) (see *Surface Charging and Point of Zero Charge*, Marek Kosmulski, pp. 745-747, CRC Press, 2009, ISBN: 978-1-4200-5188-9). It will be understood that the IEP of the sulfide minerals can vary widely depending on the degree of surface oxidation and the presence of potential determining ions. Nevertheless, under the conditions of the inventive embodiments, though pH ranges of between 1.0 and 6 are envisaged, the optimum pH will be within the range of about 1.8 to about 3.5.

Within the scope of embodiments of the present invention, the optimum molar ratio of $Cu^{2+}/CuFeS_2$ is between approximately 0.01 to 0.125. Without wishing to be held to any particular theory, the inventors believe that the larger molar ratios (e.g., 1 to 4 or greater) used in prior art methods lead to a Cu metathesis reaction, which is a different reaction than those inventive methods described herein. Without deviating from the scope of the present invention, it will be understood that mechano-chemical reaction methods can be advantageously used to impart and retain a majority of the induced lattice strain even at elevated molar ratios of $Cu^{2+}/CuFeS_2$ (e.g., 1 to 4 or greater). It will also be understood that oxidative leaching should be initiated as soon as possible after completion of the activation reaction (e.g., less than about 20 minutes and more preferably less than about 5 minutes). It will be further understood, that while the molar ratios of $Cu^{2+}/CuFeS_2$ within the reaction medium may be in excess of one, the degree of chalcopyrite conversion may still be limited to approximately one- to ten-percent to derive the benefits and advantages of the present invention. It will be still further understood that determining the optimum reaction conditions (i.e., temperature, reactant concentrations/activities, Eh, pH, particle size, reaction time) which provide for the induced lattice strain within the $CuFeS_2$ moiety of compounds of Formula I are within the scope of the invention and that such methods are known to those skilled in the art.

The reaction system may also contain ferric ions, such that the ratio of ferric to ferrous concentration(s) is/are low enough to allow the synthesis of compounds defined by Formula I to proceed at an appreciable rate. This ratio of ferric to ferrous, in the absence of any other redox couple, determines the interfacial and/or solution redox potential. The solution redox potential is controlled to less than about 600 mV (SHE), and more preferably less than about 550 mV, but greater than about 200 mV to prevent undesirable, competing side reactions.

When the activated products of Formula I were subsequently subjected to oxidative dissolution, the rate of release of copper from the activated compound was significantly greater than the rate that would be expected from either chalcopyrite particles or chalcopyrite particles with covellite rimming. When activated products of Formula I were allowed to undergo aging, at a temperature such that lattice relaxation led to the formation of reaction products having Formula IV, the rate of Cu dissolution under oxidizing conditions was no greater than that expected for physical combinations of chalcopyrite and covellite.

The product material of Formula I, and its electrochemical properties, are believed not to have been previously recognized or appreciated by others (e.g., during the full or substantially complete conversion of chalcopyrite to a covellite phase as done by the Sherritt-Cominco Copper Process). The inventors believe that others have not recognized or appreciated that a limited (e.g., as low as 0.10 molar ratio or less) extent of reaction between chalcopyrite and $Cu^{2+}$ can produce activated compounds of Formula I. Furthermore, the inventors believe that it would have been unobvious, in view of prior art teachings, that particles comprising compounds of Formula I would have any meaningful or valuable effect on the properties of such a particle. Furthermore, the inventors believe that it would have been unobvious, in view of prior teachings, to chemically convert chalcopyrite particles to a chemical moiety containing a specie of Formula I.

Another advantage of the inventive compounds and methods over prior art (e.g., the Sherritt-Cominco copper process) is that in some preferred embodiments, either very few or no measurable secondary byproducts (e.g., $Cu_2S$) are formed during the synthesis of compounds of Formula I. Furthermore, the inventors have further enhanced the reactivity of Formula I by conducting the synthesis of compounds of Formula I under mechano-chemical reaction conditions.

As with most chemical reactions, time and temperature can be varied. Selection of an appropriate temperature can take into account the temperature of starting materials (i.e., "feed type") and subsequent processes to which the activated particles comprising compounds of Formula I are expected to be subjected. For example, performing the activation reaction at a temperature of about 70-80° C. is considered appropriate in chalcopyrite-containing ore processing operations. Those skilled in the art will recognize that temperatures above about 80° C. do not deviate from the inventive method and will lead to faster reaction rates (i.e., activation and lattice relaxation), while temperatures below about 80° C. will lead to longer reaction times and slower rates of lattice relaxation. Those skilled in the art will also recognize that the relaxation process, in which compounds of Formula I are converted to compounds of Formula IV will accelerate as the reaction temperature is increased significantly above about 70-80° C. and in the absence of mechano-chemical process methods.

Those skilled in the art will also recognize that since these are solid-state diffusion controlled reactions, the particle size distribution of the solid-state reactants will influence the rate of reaction and the reactivity of the activated, solid-state products comprising the chemical compositions of Formula I. For example, finer particles will have a higher surface to volume ratio which might tend to increase the reactivity of the product material toward oxidative leaching.

In view of fact that the rate of these reactions are solid-state diffusion controlled and that the reactions are initiated at particle surfaces, the size and surface area of chalcopyrite-containing particles (i.e., surface to volume ratio) is expected to be important. Ordinary experimentation involving varying particle size, reactant concentrations, and temperature during either the partial or complete conversion of chalcopyrite to compounds defined by Formula I can be expected to yield a combination of particle size, temperature, and duration of reaction which are appropriate for a variety of operating materials and conditions, and such process optimization is within the ken of an ordinary artisan in this field.

Without being held to any particular theory, the inventors believe that the success of the inventive method for producing the new compounds defined by Formula I is dependent, in part, upon the mole ratio of copper to iron used in the reaction and the combination of reaction time and temperature. Mole ratios of copper to iron of about 0.5 to 5 are acceptable, while mole ratios of 0.5 to 0.1 are preferred, while mole ratios of about 0.1 to 0.01 are more preferred. The mole ratio of copper to iron refers to the amount of cupric ion in solution able to react with the amount of iron contained in the chalcopyrite (i.e., $[Cu^{2+}]/[CuFeS_2]$). Without wishing to be held to any particular theory, the inventors believe that higher mole ratios and long reaction times, as used in prior art methods, lead to undesirable side reactions, such as lattice strain relaxation, the excessive formation of covellite, and parasitic side reactions involving the formation of additional semiconductor phases (e.g., $Cu_2S$). Without wishing to be held to any particular theory, the inventors believe that reaction sensitivity towards the slurry pH and the IEP of the chalcopyrite surface suggests that the sulfide moieties within an interphase regime at/near the particle surface possess unique reactivity which enables the synthesis of compounds defined by Formula I.

The conversion of chalcopyrite particles to compositions comprising compounds defined by Formula I can be performed in a stirred media reactor, such as the "SMRt reactor" described in greater detail in U.S. provisional application 62/082,293 and other co-pending applications referenced in the "CROSS-REFERENCE TO RELATED APPLICATIONS" paragraph. Alternatively, the chalcopyrite-containing feed can be ground prior to activation. Those skilled in the art will recognize that chalcopyrite reactivity (i.e., reaction rates for the formation of compounds defined by Formula I) will tend to increase with increasing surface to volume ratios. The reaction can be performed under reducing conditions, i.e., a solution reduction potential less than about 600 millivolts and low $Fe^{3+}$ and $H^+$ ion activities such that the slurry pH is at or above the IEP of the chalcopyrite surface.

Although the method of preparing compounds defined by Formula I can be performed under normal (i.e., oxygen-containing) atmospheric conditions, it is preferably performed substantially anoxically to limit ferric ion activity, at least during the initiation of the reaction. Attaining and maintaining the proper slurry redox potential and maintaining a sufficiently low ferric ion activity within the slurry is further aided by pH control, wherein the pH is maintained between about 1.0 to about 1.5, more preferably between about 1.5 to about 3.5. Higher pH ranges are permissible (e.g., but should not be so high as to appreciably interfere with the solubility of cupric ions).

Preliminary transmission electron microscopy (TEM) results indicate that chalcopyrite particles comprising compounds defined by Formula I comprise lattice strain which is inherent to compounds of Formula I. The reaction products represent a new chemical moiety that is neither chalcopyrite nor covellite. Without being bound by any particular theory of operation, the inventors believe that the iron- and sulfur-depleted moiety of compounds defined by Formula I can be converted into covellite, as for example in an annealing process.

The inventors anticipate that the highly reactive compounds defined by Formula I, produced as described herein, can be used in a variety of electrochemical & photochemical processes such as photo-voltaic processes, downstream copper extraction processes, including heap leach processes, reactor leach processes, biologically-assisted leach processes, and combinations of these, without limitation.

The invention claimed is:

1. A compound defined by Formula I:

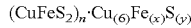

$$(CuFeS_2)_n \cdot Cu_{(6)}Fe_{(x)}S_{(y)} \qquad I,$$

wherein:
n is 10 to 200;
x is 1.2 to 1.4;
y is 7.2 to 7.4; and
y−x =6.

2. A compound according to claim 1, wherein x is 1.2, and y is 7.2.

3. A compound according to claim 1, wherein x is and y is 7.4.

4. A composition comprising the compound defined in claim 1.

5. A method of making the compound defined in claim 1, comprising synthesizing the compound defined in claim 1.

6. The method according to claim 5, wherein the synthesizing is performed using a stirred-media reactor.

7. The method according to claim 5, wherein the synthesizing is performed in the presence of copper sulfate.

8. The method according to claim 5, wherein the step of synthesizing is performed at a pH between about 1.0 and about 6.0.

9. The method according to claim 5, wherein the synthesizing is performed at a temperature between about 60° C. and about 100° C.

10. The method according to claim 5, wherein the synthesizing is performed at a redox potential between about 200mV vs. SHE and about 600mV vs. SHE.

11. The method according to claim 5, wherein the synthesizing is performed for a time between about 1 minute and about 60 minutes.

12. A method of recovering copper comprising the step of oxidatively leaching the compound defined in claim 1, in the presence of an acidic ferric sulfate lixivant.

13. The method of recovering copper according to claim 12, wherein the step of oxidatively leaching is performed under mechano-chemical reaction conditions.

14. The method of recovering copper according to claim 12, wherein the step of oxidatively leaching is performed using a stirred-media reactor.

* * * * *